United States Patent [19]
Chen et al.

[11] Patent Number: 5,344,669
[45] Date of Patent: Sep. 6, 1994

[54] METHOD OF MANUFACTURE FOR AN IMPROVED MAGNETORESISTIVE READ TRANSDUCER

[75] Inventors: Mao-Min Chen, San Jose; Ching H. Tsang, Sunnyvale, both of Calif.

[73] Assignee: International Business Machines Corporation, Armonk, N.Y.

[21] Appl. No.: 125,987

[22] Filed: Sep. 23, 1993

Related U.S. Application Data

[62] Division of Ser. No. 779,221, Oct. 18, 1991, Pat. No. 5,262,914.

[51] Int. Cl.$^5$ ............................................. B05D 5/12
[52] U.S. Cl. .................................... 427/130; 427/131; 427/132
[58] Field of Search ...................... 427/131, 130, 132

[56] References Cited

U.S. PATENT DOCUMENTS

| | | | |
|---|---|---|---|
| 3,982,234 | 9/1976 | Voegeli et al. | 340/174 TF |
| 4,103,315 | 7/1978 | Hempstead et al. | 360/110 |
| 4,785,366 | 11/1988 | Krounbi et al. | 360/113 |
| 4,809,109 | 2/1989 | Howard et al. | 360/113 |
| 4,825,325 | 4/1989 | Howard | 360/113 |
| 5,032,945 | 7/1991 | Argyle et al. | 360/126 |

*Primary Examiner*—Bernard Pianalto
*Attorney, Agent, or Firm*—Leslie G. Murray

[57] ABSTRACT

A magnetoresistive (MR) read transducer in which a layered structure comprising an MR layer, an antiferromagnetic material in direct contact with the MR layer and a thin layer of interdiffusion material in contact with the layer of antiferromagnetic material is subjected to a heating process to a temperature within a chosen temperature for a chosen time to form a magnetic interface between the antiferromagnetic material the MR layer. The magnetic interface produces a high level of exchange bias with the MR layer.

9 Claims, 5 Drawing Sheets

METHOD OF MANUFACTURE FOR AN IMPROVED MAGNETORESISTIVE READ TRANSDUCER

This is a divisional of U.S. patent application Ser. No. 07/779,221 filed Oct. 18, 1991, U.S. Pat. No. 5,262,914.

BACKGROUND OF THE INVENTION

1. Field of the Invention

This invention relates in general to magnetic transducers for reading information signals from a magnetic medium and, in particular, to an improved magnetoresistive read transducer and a method for making the improved transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

The prior art also teaches that in order for a MR sensor to operate optimally, two bias fields should be provided. In order to bias the material so that its response to a flux field is linear, a transverse bias field is generally provided. This bias field is normal to the plane of the magnetic media and parallel to the surface of the planar MR sensor.

The other bias field which is usually employed with MR sensors is referred to in the art as the longitudinal bias field, which extends parallel to the surface of the magnetic media and parallel to the lengthwise direction of the MR sensor. The function of the longitudinal bias field is to suppress Barkhausen noise, which originates from multi-domain activities in the MR sensor.

A MR sensor for reading information signals from a magnetic recording medium is described in U.S. Pat. No. 4,103,315 to Hempstead, et al., which is assigned to the same assignee as this application. The '315 patent describes a MR read sensor which utilizes antiferromagnetic-ferromagnetic exchange coupling to produce a uniform longitudinal bias in the MR layer of the sensor. The materials suggested by the '315 patent are nickel-iron (NiFe) as the ferromagnetic MR layer and a manganese (Mn) alloy as the antiferromagnetic layer. Of the possible Mn alloys, iron-manganese (FeMn) appears to exhibit the greatest ability to exchange couple with the NiFe layer, and the FeMn is deposited directly on the NiFe to obtain the exchange bias effect. The strength of the exchange bias field developed by the materials suggested in the '315 patent was sufficient to meet prior art requirements. However, the drive to increased recording density has led to the requirement for greater levels of exchange bias field.

The use of a thermal treatment to produce a new ternary antiferromagnetic material by diffusion between contacting layers of NiFe and FeMn is described in U.S. Pat. No. 4,809,109. This method produces a higher level of exchange bias field and an increase in the ordering temperature of the antiferromagnetic material. However, this method is not compatible with prior art manufacturing processes for thin film magnetic heads.

The prior art does not disclose an MR head which produces a high level of exchange bias which can be produced by a process which is compatible with prior art manufacturing processes for thin film magnetic heads.

SUMMARY OF THE INVENTION

It is therefore the principal object of this invention to increase the exchange bias magnitude of a magnetoresistive (MR) read transducer.

In accordance with the invention, the objective is achieved by providing a thin MR layer of ferromagnetic material, a thin layer of antiferromagnetic material in direct contact with the MR layer, and a thin layer of an interdiffusion material in contact with the layer of antiferromagnetic material. This layered structure is subjected to heating to a temperature within a predetermined range for a predetermined time to form a magnetic interface between the layer of antiferromagnetic material and the MR layer. This magnetic interface material produces a high exchange bias field with the MR layer.

In a specific embodiment the MR layer comprises NiFe, the layer of antiferromagnetic material comprises MnFe, the interdiffusion material is gold and the heating step comprises heating to a temperature of about 240° C. for a time of about 7 hours. This method is fully compatible with prior art manufacturing processes for thin film magnetic heads.

The foregoing and other objects, features and advantages of the invention will be apparent from the following more particular description of a preferred embodiment of the invention as illustrated in accompanying drawings.

DESCRIPTION OF THE PREFERRED EMBODIMENT

Figure 1:
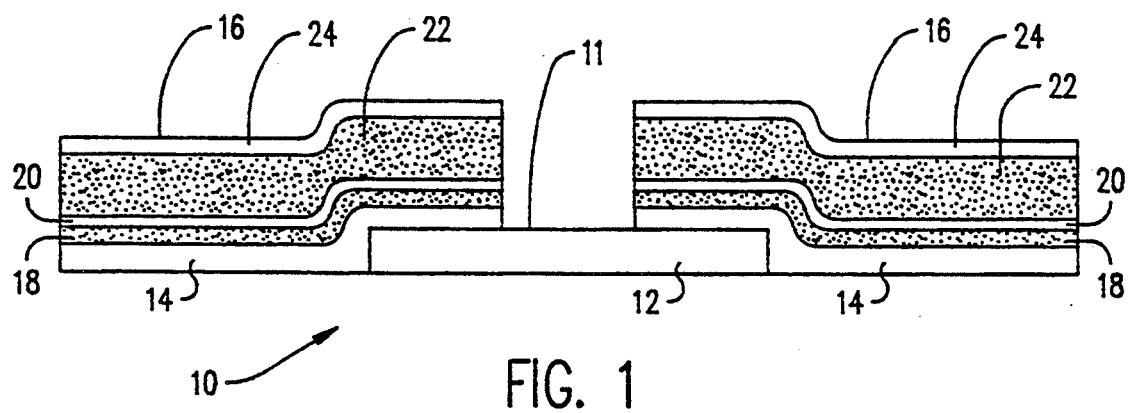
FIG. 1 is an end view of a specific embodiment of a magnetoresistive read transducer according to the present invention.

A specific embodiment of a magnetoresistive (MR) sensor will be described briefly in conjunction with FIG. 1. The MR sensor 10 comprises a thin MR layer of ferromagnetic material 12 which extends only over the central active region 11. A thin layer of a suitable antiferromagnetic material 14 is deposited in good interfacial contact with the MR layer 12. A resultant unidirectional anisotropy develops by means of exchange coupling across the interface between MR layer 12 and antiferromagnetic layer 14 and produces a shift of the MH loop of the MR layer which is usually called the longitudinal exchange bias field $H_{ua}$. The transverse bias can be produced by a soft magnetic film layer (not shown) which is separated from the MR layer 12 by a thin nonmagnetic spacer layer (not shown) whose purpose is to prevent magnetic exchange between the MR layer 12 and the soft magnetic bias layer as is known in the art. Conductor leads 16 are included for connection to a sensing means (not shown) for sensing an output signal as is know in the art. In the embodiment shown, conductor leads 16 comprise a layered structure comprising a thin layer of tantalum (Ta) 20, a layer of a good conductor 22, such as gold (Au) and a thin capping layer of Ta 24.

Figure 2:
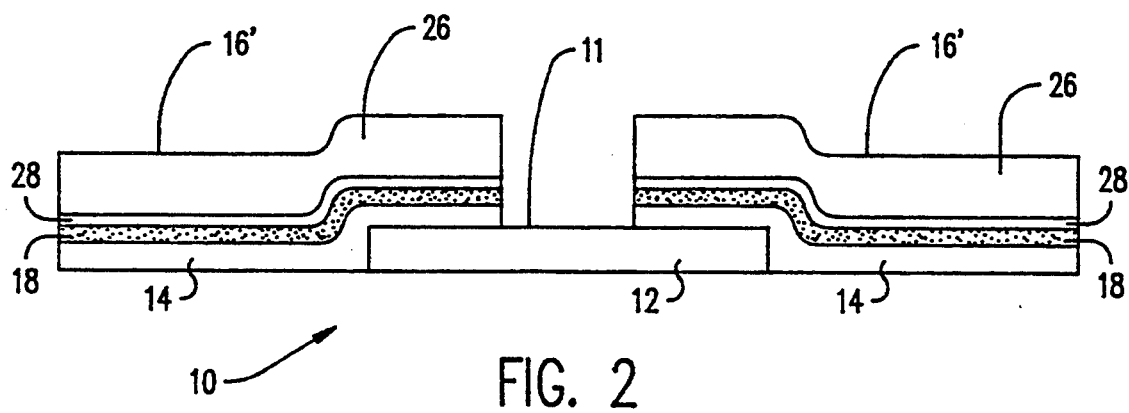
FIG. 2 is an end view of an alternate embodiment of a magnetoresistive read transducer according to the present invention.

In the embodiment shown in FIG. 2, a different metallurgy is used for conductor leads 16' which comprises a layer of a good conductor 26. Depending on the properties of the chosen material for conductor 26, a layer of either adhesion and/or diffusion barrier 28 may be required.

According to the present invention, the exchange bias for the MR/antiferromagnetic couple films is substantially increased by the addition of a layer of interdiffusion material 18 which is deposited in contact with the layer of antiferromagnetic material 14.

In a specific embodiment the preferred material for the MR layer 12 is NiFe and the preferred material for the antiferromagnetic layer 14 is MnFe. The layer of interdiffusion material is preferably a noble metal such as gold, rhodium, platinum, palladium, or ruthenium. However, other elements, such as copper and silicon, which are readily interdiffusable with MnFe, are possible candidates for this application.

Figure 3:
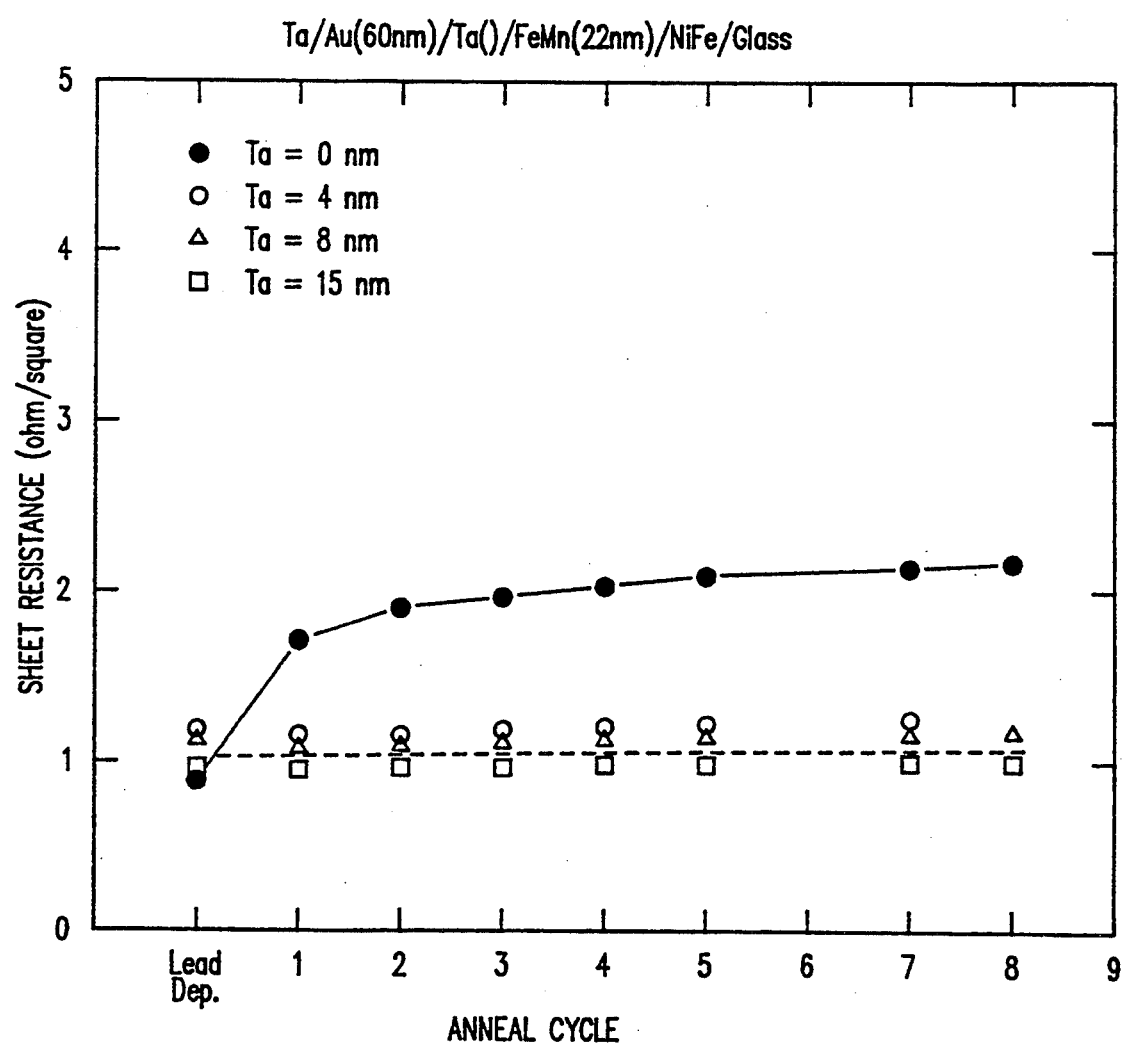
FIG. 3 is a graph of sheet resistance as a function of process annealing treatments for a series of layered structures in which the thickness of a tantalum capping layer is varied from 0 to 15 nm.

To demonstrate the principle of the present invention, a layered structure was built to vary the amount of interdiffusion between the layer of interdiffusion material 18 and the antiferromagnetic layer 14. The films comprising the layered structure were sputter deposited onto glass in the following configuration:

Ta (200 Å)/Au (600 Å)/Ta (thickness varied)/MnFe (240 Å)/NiFe/ glass, and the layered structures were subjected to a plurality of the standard vacuum annealing cycles (240° C., 7 hours). The results are shown in FIG. 3 where it can be seen that the structure without the Ta spacer layer shows a substantial increase in sheet resistance upon only one annealing cycle and reached a steady state with more annealing cycles. Auger depth profiling confirms that interdiffusion occurred at 240° C. rapidly between Au and MnFe. FIG. 3 also illustrates that a very thin Ta film of 40 Å or thicker is effective to suppress the interdiffusion.

Figure 4:
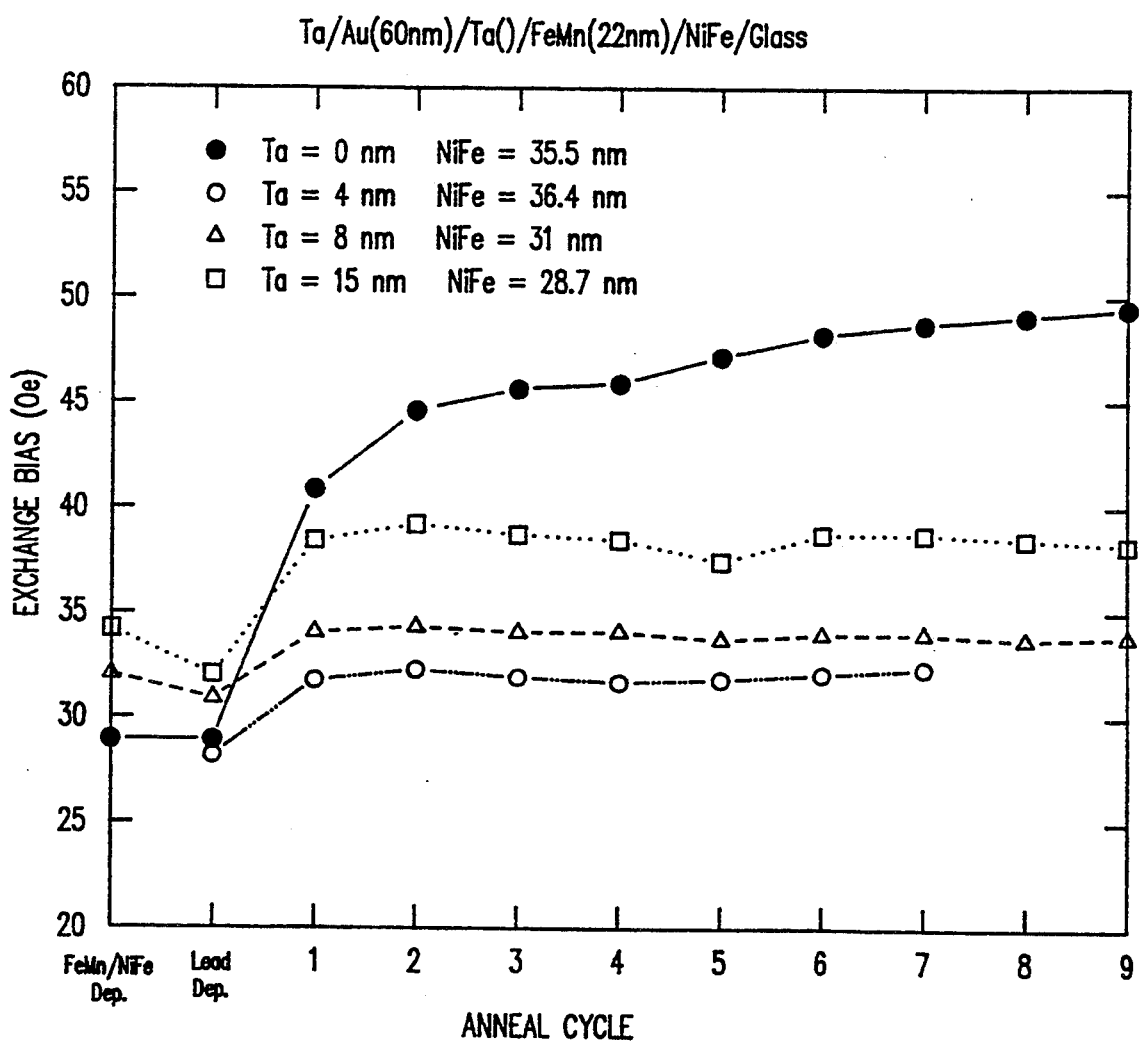
FIG. 4 is a graph of exchange bias field as a function of process annealing treatments for a series of layered structures in which the thickness of a tantalum capping layer is varied from 0 to 15 nm.
Figure 5:
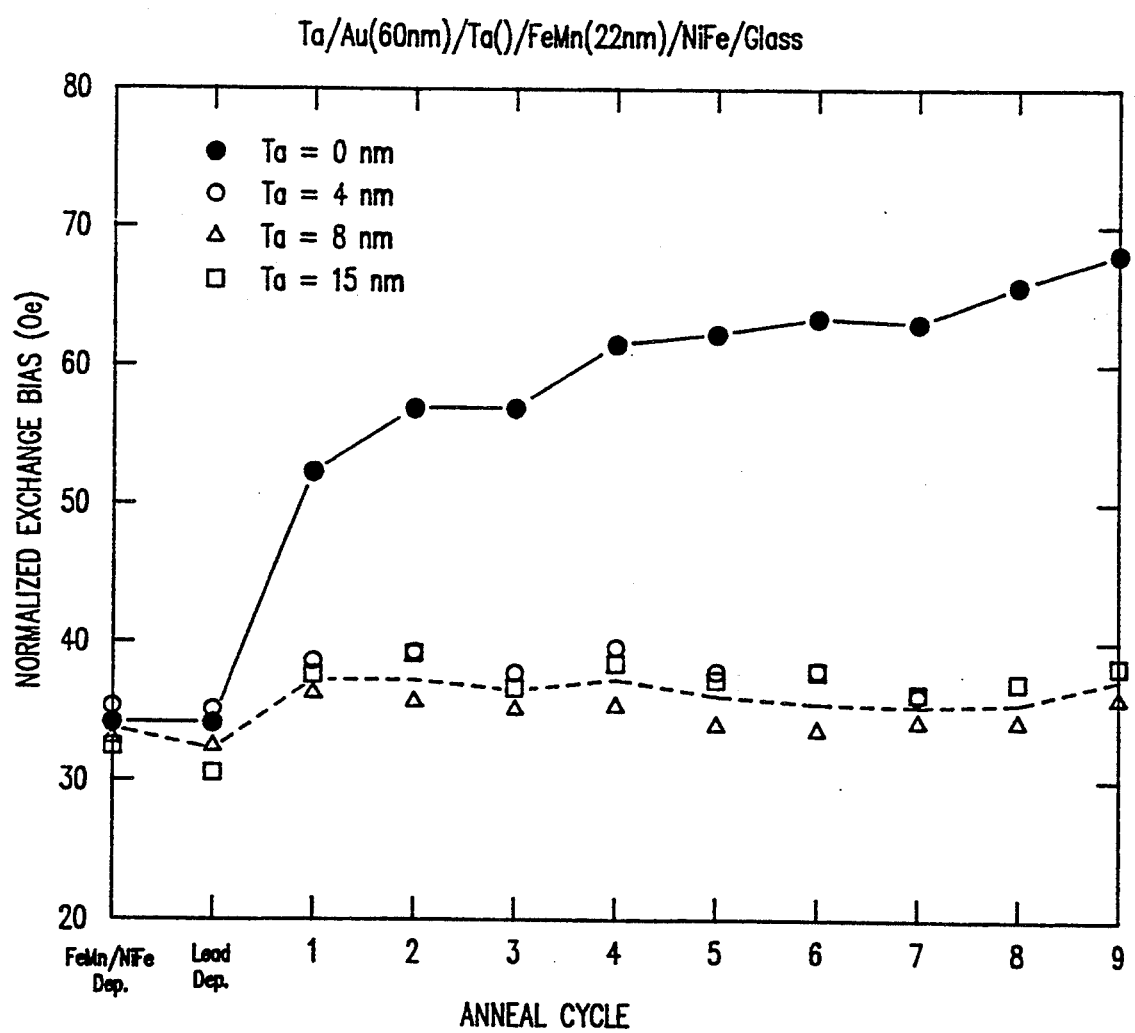
FIG. 5 is a graph of exchange bias, normalized to 300 Å NiFe, as a function of process annealing treatments for the series of layered structures shown in FIG. 4.

The exchange bias of the same structures as a function of the annealing cycles is shown in FIGS. 4 and 5. FIG. 4 shows the exchange bias vs. standard vacuum annealing cycle for the structures with various Ta interlayer thickness. It can be seen that for the structure with the MnFe in direct contact with the Au, the exchange bias increases dramatically upon annealing. The exchange bias value increased from 28.8 Oe for the as-deposited film to a value of 49.1 Oe after nine annealing cycles. The other structures with a Ta interlayer thickness of more than 40 Å showed only modest increases in exchange bias. This clearly shows that interdiffusion between Au and MnFe plays an important role of enhancing the exchange bias value.

This is even more clearly shown in FIG. 5 which shows the normalized exchange bias for the same structures shown in FIG. 4. Note in the legend at the upper left of FIG. 4 that the thickness of the NiFe layers varies. For comparison, the exchange bias normalized to 300 Å NiFe thickness vs. annealing cycle is shown in FIG. 5. The normalized exchange bias increased from 34 Oe (as-deposited film) to 61.7 Oe after five vacuum annealing cycles for the structure without a Ta interlayer, while the rest of the structures with various Ta interlayer thicknesses show only very slight increase.

The microstructure origins to these exchange bias enhancements are not clearly understood. It is clear that a thermally formed magnetic interface is formed between the antiferromagnetic material 14 and the MR layer 12. The magnetic interface is that interface at which the materials system changes from a ferromagnetic character on one side to an antiferromagnetic character on the other side. The altered composition at the magnetic interface may comprise a ternary or other antiferromagnetic composition.

The enhancement in exchange bias was observed for other Au film thickness as well. Table I shows the results of three different Au thicknesses ranging from 200 Å to 1200Å.

TABLE I

| Normalized (NiFe = 300Å) Exchange Bias | | | |
|---|---|---|---|
| | Au(200Å) | Au(600Å) | Au(1200Å) |
| MnFe/NiFe As - Dep. | 28.3 Oe | 29.9 Oe | 28.4 Oe |
| Au/Ta As - Dep. | 33.3 Oe | 34.8 Oe | |
| 1 Anneal Cycle | 44.4 Oe | 50 Oe | 45.9 Oe |
| 2 Anneal Cycles | 48.6 Oe | 54.1 Oe | 49.7 Oe |
| 3 Anneal Cycles | 50.7 Oe | 59.1 Oe | 50.7 Oe |
| 4 Anneal Cycles | 56.7 Oe | 57.1 Oe | 52.4 Oe |
| 5 Anneal Cycles | 59.3 Oe | 59.6 Oe | 54.2 Oe |
| 6 Anneal Cycles | | 62.9 Oe | |

All films capped with 200Å Ta.

The results shown in Table I demonstrate that the observed enhancement in exchange bias is operational over a wide range of gold thickness.

Figure 6:
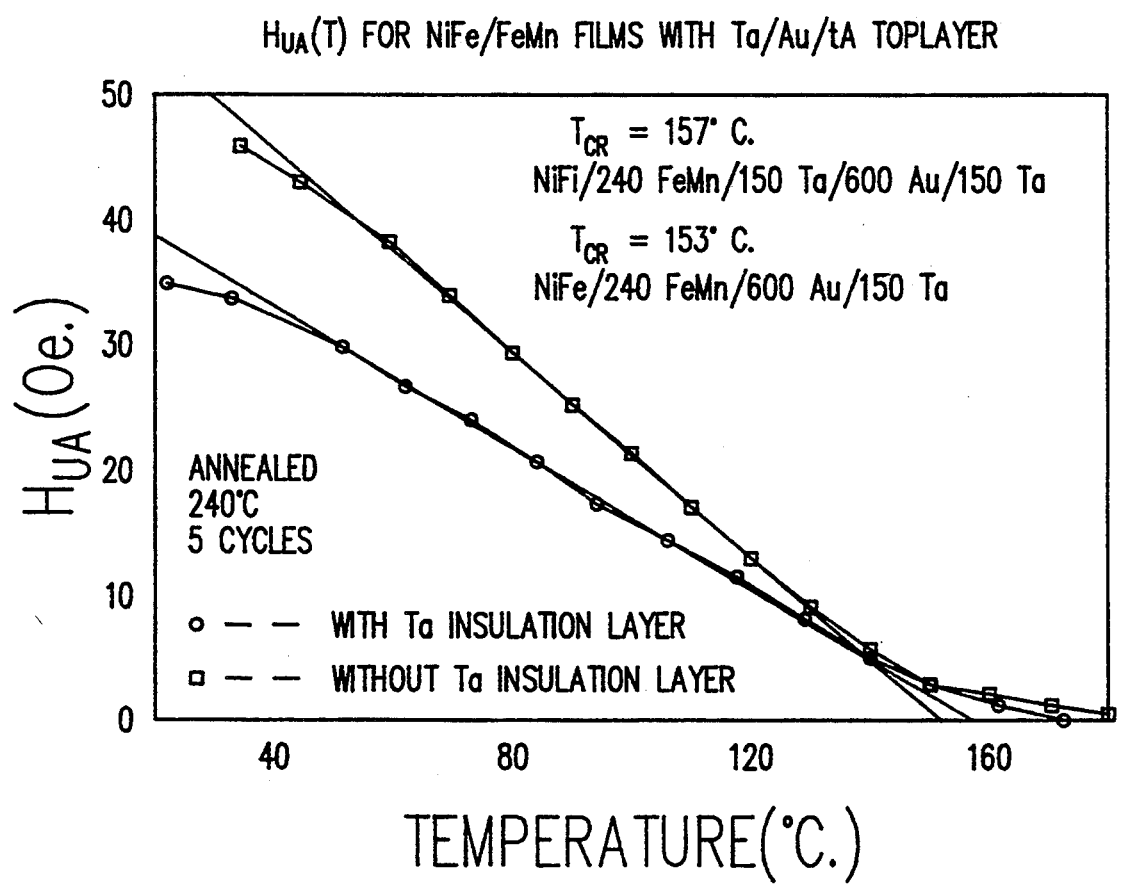
FIG. 6 is a graph of exchange bias field $H_{ua}$ as a function of temperature for layered structures with and without a tantalum interlayer.

The temperature dependences of the exchange bias normalized to 300 Å NiFe for the layered structures with and without the Ta interlayer are shown in FIG. 6 is in terms of cycles of heating at 240° C. for about 7 hours. However, a temperature within the range of 220° to 320° C. and a time within the range of 2 to 12 hours is also suitable. These structures, for which the data of FIG. 6 are shown, are the same as the first and fourth structures shown in FIG. 4. Both structures had been through five vacuum anneal cycles before measurement. Five cycles was chosen to simulate the treatment in a particular head fabrication process. The blocking temperature, inferred from the data as the intercept of the linear fit with 0 Oe, was 157° C. for the structure with 150 Å Ta interlayer, while the structure with no Ta interlayer had a blocking temperature of 153° C.

At 80° C., the normal operating temperature of the magnetic head, the normalized exchange bias is 35 Oe in the case where the Au is in direct contact with the MnFe and 21.1 Oe for the structure with the Ta interlayer which is a difference of 14 Oe.

In view of the above reported data, the preferred interdiffusion material is Au, and the preferred thickness for this layer is 200 Å. The preferred MR layer is formed of NiFe, and the preferred antiferromagnetic material in MnFe. With the use of these materials, the benefits of the thermally induced interdiffusion techniques can be obtained without adding any additional complexity to an already existing manufacturing process. The Au layer is deposited directly onto the MnFe layer and the lead metallurgy is deposited directly in the same vacuum pump-down.

A process has been disclosed by which a much higher exchange bias can be achieved with a blocking temperature that is substantially the same as prior art structures. Improved corrosion resistance also results from this process. This process can be applied to make greatly improved MR read transducers without adding more steps or complexity to the manufacturing process.

While the invention has been particularly shown and described with reference to a preferred embodiment thereof, it will be understood by those skilled in the art that various other changes in the form and details may be made therein without departing from the spirit and scope of the invention.

We claim:

1. A method for making a magnetoresistive read transducer assembly comprising the steps of:
   providing a substrate;
   depositing a thin magnetoresistive layer of ferromagnetic material on said substrate;
   depositing a thin layer of antiferromagnetic material in direct contact with the magnetoresistive layer;
   depositing a thin layer of an interdiffusion material in contact with the layer of antiferromagnetic material; and
   heating said layered structure to form a magnetic interface between said antiferromagnetic material and said magnetoresistive layer whereby said magnetic interface produces an exchange bias field in said magnetoresistive layer.

2. The method of claim 1 wherein said interdiffusion material comprises a noble metal.

3. The method of claim 2 wherein said noble metal is taken from the group consisting of gold, rhodium, platinum, palladium, and ruthenium.

4. The method of claim 1 wherein said magnetoresistive layer comprises an alloy of nickel and iron and said antiferromagnetic layer comprises an alloy of iron and manganese.

5. The method of claim 4 wherein said interdiffusion material comprises a noble metal.

6. The method of claim 5 wherein said noble metal is taken from the group consisting of gold, rhodium, platinum, and palladium, and ruthenium.

7. The method of claim 6 wherein said noble metal is gold.

8. The method of claim 7 wherein said heating step is conducted at a temperature within the range of about 220° to 320° C. for a time within the range of about 2 to 12 hours.

9. The method of claim 8 wherein said heating step is conducted at a temperature of about 240° C. for a time of about 7 hours.

* * * * *